United States Patent
Warmenhoven

(10) Patent No.: US 8,427,083 B2
(45) Date of Patent: Apr. 23, 2013

(54) POWER DISTRIBUTION SYSTEM

(75) Inventor: David E. Warmenhoven, Renton, WA (US)

(73) Assignee: Momentum Power, Inc., Renton, WA (US)

( * ) Notice: Subject to any disclaimer, the term of this patent is extended or adjusted under 35 U.S.C. 154(b) by 189 days.

(21) Appl. No.: 13/165,124

(22) Filed: Jun. 21, 2011

(65) Prior Publication Data

US 2011/0316377 A1    Dec. 29, 2011

Related U.S. Application Data

(60) Provisional application No. 61/359,297, filed on Jun. 28, 2010.

(51) Int. Cl.
*H02P 1/00* (2006.01)

(52) U.S. Cl.
USPC ........... 318/139; 318/108; 318/106; 318/107; 320/137; 320/130; 320/125; 320/127; 320/124; 320/116; 320/117; 320/118; 320/119; 320/120; 290/16; 290/14; 290/45; 290/50; 180/165; 180/65.24; 180/65.275; 180/207.3; 180/54.1; 180/292; 180/65.22; 180/65.21

(58) Field of Classification Search ............. 318/139, 318/108, 107, 106; 320/137, 130, 127, 125, 320/124, 116, 117, 118, 119, 120; 180/65.24, 180/65.275, 65.1, 65.4, 65.21, 65.22, 292, 180/207.3; 290/16, 14, 45, 50, 36 R, 38 R, 290/47, 48

See application file for complete search history.

(56) References Cited

U.S. PATENT DOCUMENTS

| | | | | |
|---|---|---|---|---|
| 4,309,620 A * | 1/1982 | Bock | ............................. | 290/4 R |
| 6,170,587 B1 * | 1/2001 | Bullock | ....................... | 180/69.6 |
| 6,452,511 B1 * | 9/2002 | Kelly et al. | ................... | 340/970 |
| 6,984,908 B2 | 1/2006 | Rinholm | | |
| 7,304,445 B2 * | 12/2007 | Donnelly | ...................... | 318/108 |
| 7,416,039 B1 * | 8/2008 | Anderson et al. | ............. | 180/165 |
| 7,642,749 B2 * | 1/2010 | Nishida | ......................... | 320/119 |
| 8,159,078 B2 * | 4/2012 | Usselman et al. | ............ | 290/1 A |
| 8,232,767 B2 * | 7/2012 | Oh et al. | ...................... | 320/121 |

FOREIGN PATENT DOCUMENTS

WO    02/087918 A1    7/2002

OTHER PUBLICATIONS

Comanescu, M., et al., "Design and Analysis of 42-V Permanent-Magnet Generator for Automotive Applications," IEE Transactions on Energy Conversion 18(1):107-112, Mar. 2003.

(Continued)

*Primary Examiner* — Rita Leykin
(74) *Attorney, Agent, or Firm* — Christensen O'Connor Johnson Kindness PLLC

(57) ABSTRACT

A four-stage power distribution system (100) includes (i) a first stage (110) having an inverter (112) that provides power to a frequency drive (114) and an electric motor (116) controlled by the frequency drive; (ii) a second stage (120) having a flywheel (122) driven by the motor; (iii) a third stage (130) having an alternator (132) driven by the motor (116) and connected to the flywheel, and a rectifier (134) that receives current from the alternator and generates a direct current; and (iv) a fourth stage (140) having a charge control switch (142) that receives power from the rectifier, and a plurality of power storage devices such as batteries (144A-144C). A master control switch (150) controls the charge control switch to transition the plurality of batteries individually between a charging configuration and a load configuration. One or more of the battery(ies) in the load configuration provides power to the inverter.

20 Claims, 6 Drawing Sheets

OTHER PUBLICATIONS

Jensen, C.J., et al., "A Low-Loss Permanent Magnet Brushless dc Motor Utilizing Tape Wound Amorphous Iron," IEEE Transactions on Industry Applications 28(3):646-651, May/Jun. 1992.

Proca, A.B., et al., "Analytical Model for Permanent Magnet Motors With Surface Mounted Magnets," IEEE Transactions on Energy Conversion 18(3):386-391, Sep. 2003.

* cited by examiner

POWER DISTRIBUTION SYSTEM

CROSS-REFERENCE TO RELATED APPLICATION

This application claims the benefit of Provisional Application No. 61/359,297, filed Jun. 28, 2010, the entire disclosure of which is hereby incorporated by reference herein.

BACKGROUND

Systems for providing electrical power are known in the art. For example, battery or fuel cell power systems, and hybrid systems that combine fossil fuel engines with batteries or fuel cells have been developed to provide power to motor vehicles such as cars, trucks, watercraft, and the like. Non-mobile, small-scale systems for generating and distributing power are also known. Electrical power systems may include non-fossil fuel power sources such as solar, solar-thermal, wind, geo-thermal, and/or hydroelectric energy sources.

The power generation steps and the power distribution or usage steps typically are not synchronized in time. Power storage and distribution systems, such as banks of batteries, fuel cells, or the like receive power from power generators and distribute the power to the external power users. It is desirable to optimize the efficiency and operational life of the power storage and distribution systems.

Certain batteries, for example, will degrade over time from cycling between a high charge level and a low charge level, and may even become mechanically damaged from such cycling. It is desirable that such batteries be maintained at a relatively high charge level to extend the useful life of the batteries.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A four-stage power distribution system is disclosed. In the current embodiment, the first stage comprises an inverter that receives a direct current ($DC_1$) and generates an alternating current ($AC_1$), a variable frequency drive that receives $AC_1$ and generates an alternating current ($AC_2$), and an electric motor, for example a gear motor, that is powered by $AC_2$. The second stage comprises a low-energy flywheel driven by the motor. The third stage comprises an alternator, for example a permanent magnet alternator that is driven by the motor to produce a third alternating current ($AC_3$), and a rectifier that receives $AC_3$ and produces a direct current ($DC_2$). The fourth stage comprises a charge control switch that receives $DC_2$ and a plurality of batteries, for example three batteries. The charge control switch sequentially cycles or transitions the plurality of batteries such that at least one of the batteries is connected to be charged by $DC_2$, and at least one of the batteries is connected to provide $DC_1$. A master control switch controls the operation of the charge control switch.

In an embodiment, $AC_2$ is three phase, and the charge control switch cycles the batteries at a fixed interval between 45 seconds and 90 seconds.

In an embodiment, the charge control switch is connected to three batteries and cycles through the batteries such that at a given time, two of the batteries are in charge mode and one of the batteries provides $DC_1$, and the batteries in charge mode are connected in series or in parallel. In an embodiment, when transitioning one battery from charge mode to load mode and another battery from load mode to charge mode, the batteries briefly overlap in providing $DC_1$.

In an embodiment, the charge control switch comprises a plurality of relays.

In an embodiment, the third stage further comprises a second alternator that is driven by the motor and a second rectifier that cooperatively produce a third direct current, and the fourth stage further comprises a second charge control switch and plurality of batteries that produce electrical power for external use.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
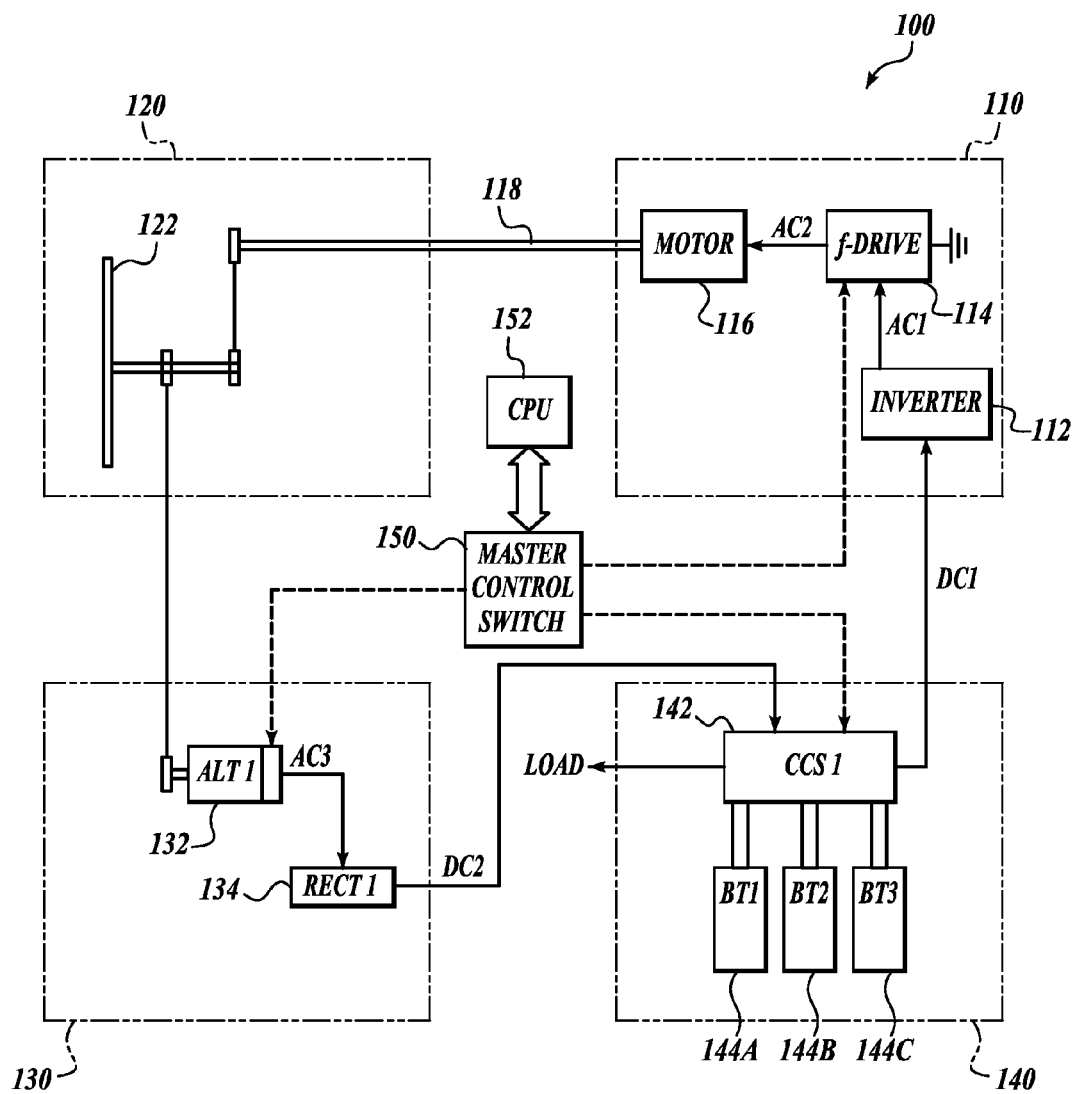
FIG. 1 is a system diagram of a first embodiment of a power distribution system in accordance with the present invention.

A first embodiment of a power distribution system 100 that maintains a plurality of batteries at an optimal balanced charge level for a period of time is shown in FIG. 1.

The power distribution system 100 in this embodiment has four stages. A first stage 110 includes a power inverter 112 that receives a first direct current $DC_1$, and converts the first direct current $DC_1$ to a first alternating current $AC_1$. It is within the skill in the art to select a suitable inverter. An exemplary inverter is a solid-state modified or pure sine wave inverter that converts 12V DC to three-phase 220V AC. The first stage 100 also includes a variable frequency drive 114 that receives the first alternating current $AC_1$ from the inverter 112, and produces a second alternating current $AC_2$, which in a current embodiment is a three-phase current having a selectable frequency. For example, the variable frequency drive 114 in a current embodiment is a GE Fuji AF-300Mini™ drive. The first stage 110 also includes an alternating current electric motor 116 that is powered by the second alternating current $AC_2$ from the frequency drive 114. For example, the motor 116 in a current embodiment is a Browning 2-hp, three-phase 230 V gear motor. The motor 116 rotatably drives a driveshaft 118.

The four-stage power distribution system 100 includes a second stage 120 comprising a low-speed/low-energy flywheel 122 that is drivably connected to the driveshaft 118. In a current embodiment, the driveshaft 118 is driven by the electric motor 116 at about 60 rpm, which drives the flywheel 122 at about 180 rpm. A current exemplary flywheel 122 is about twenty-eight inches in diameter, and weighs ninety pounds, with the majority of the weight concentrated at the rim. It is believed that selecting suitable rotational speeds for a particular application is within the skill in the art.

The four-stage power distribution system 100 includes a third stage 130 comprising a first alternator 132 that is drivably connected to the motor 118 through the flywheel 122. The first alternator 132 generates a third alternating current $AC_3$ that is provided to a rectifier 134, which generates a second direct current $DC_2$. In a current embodiment the rectifier 134 comprises a full-wave bridge rectifier, and the alternator comprises a WindyNation Windtura™ 500 permanent magnet alternator, which is driven at between 200 and 280 rpm during operation.

The four-stage power distribution system 100 includes a fourth stage 140 comprising a charge control switch 142 that is configured to receive the second direct current $DC_2$. A plurality of batteries 144A, 144B, and 144C (three shown) are connected to the charge control switch 142. In a current embodiment the batteries are conventional 12V lead-acid batteries.

The charge control switch 142 is operable to sequentially transition the plurality of batteries 144A-144C on a regular schedule such that a first subset (e.g., two) of the plurality of batteries are charged by the second direct current $DC_2$, and the other battery(ies) is connected to provide the first direct current $DC_1$ to the inverter 112 in the first stage 110.

In a current embodiment, the charge control switch 142 includes a plurality of relays (not visible) that are controlled by a master control switch 150 which may optionally be connected to a computer 152. The relays are operable to selectively and individually switch the batteries 144A-144C between a charging configuration, wherein the second direct current $DC_2$ is connected to charge the batteries, and a load configuration, wherein the battery(ies) is configured to discharge power, for example, providing the first direct current $DC_1$ to the inverter 112.

The master control switch 150 is in signal communication with the variable frequency drive 114 to control the speed of the motor 116. It may also be in signal communication with a fan on the alternator 132 and operable to control the alternator 132 temperature. The master control switch 150 is also in signal communication with the charge control switch 142, to control the battery cycling, as described in more detail below. In a preferred embodiment the master control switch 150 receives data from the system 100 and transmits control signals to control the system 100.

For example, maintaining the alternator 132 temperature within a desired range may be desirable for optimum efficiency. The master control switch 150 may receive temperature data from the alternator 132 and engage the fan when the alternator temperature is at or above a predetermined threshold. In particular, the master control switch 150 is operable to control the cycling of the batteries 144A-144C between a charging configuration and a load configuration. It has been found that by cycling the batteries 144A-144C as discussed herein, they can be maintained in an optimal state of charge for a longer period of time.

In the three-battery embodiment shown in FIG. 1, a fixed interval for transitioning the batteries is selected, for example, 60 seconds. Therefore, in this example, every 60 seconds one battery is transitioned from the charging configuration to the load configuration, and the battery in the load configuration is transitioned to the charging configuration. Although the selected interval may depend on the particular application, an interval of between 45 seconds and 90 seconds has been found effective. At the beginning of a first interval, the charge control switch 142 is configured such that batteries 144A and 144B are in a charging configuration (with respect to the second direct current $DC_2$) and the load battery 144C is in the load configuration, providing the first direct current $DC_1$ to the inverter 112. Near the end of the first interval, charging battery 144A is switched to the load configuration by the charge control switch 142, and the third battery 144C is switched to the charging configuration.

It has been found advantageous to switch the charging battery to load configuration before switching the load battery to charging configuration, such that two batteries are briefly connected in parallel in the load configuration, i.e., to "overlap" the batteries switching between a charging configuration and a load configuration. The brief overlap period ensures that there is no interruption in the power provided to the inverter 112. In a current embodiment, the parallel load period is about 0.3 seconds.

Near the end of the second interval the other charging battery 144B is similarly switched to the load configuration, and the load battery 144A is switched to the charging configuration, again overlapping the switch such that the two batteries 144A and 144B are briefly connected in parallel in the load configuration. Therefore, in this example and with a selected interval of 60 seconds, for every 3 minutes, each of the batteries 144A, 144B, and 144C are in the charging configuration for approximately 120 seconds and are in the load configuration for approximately 60 seconds.

Figure 2:
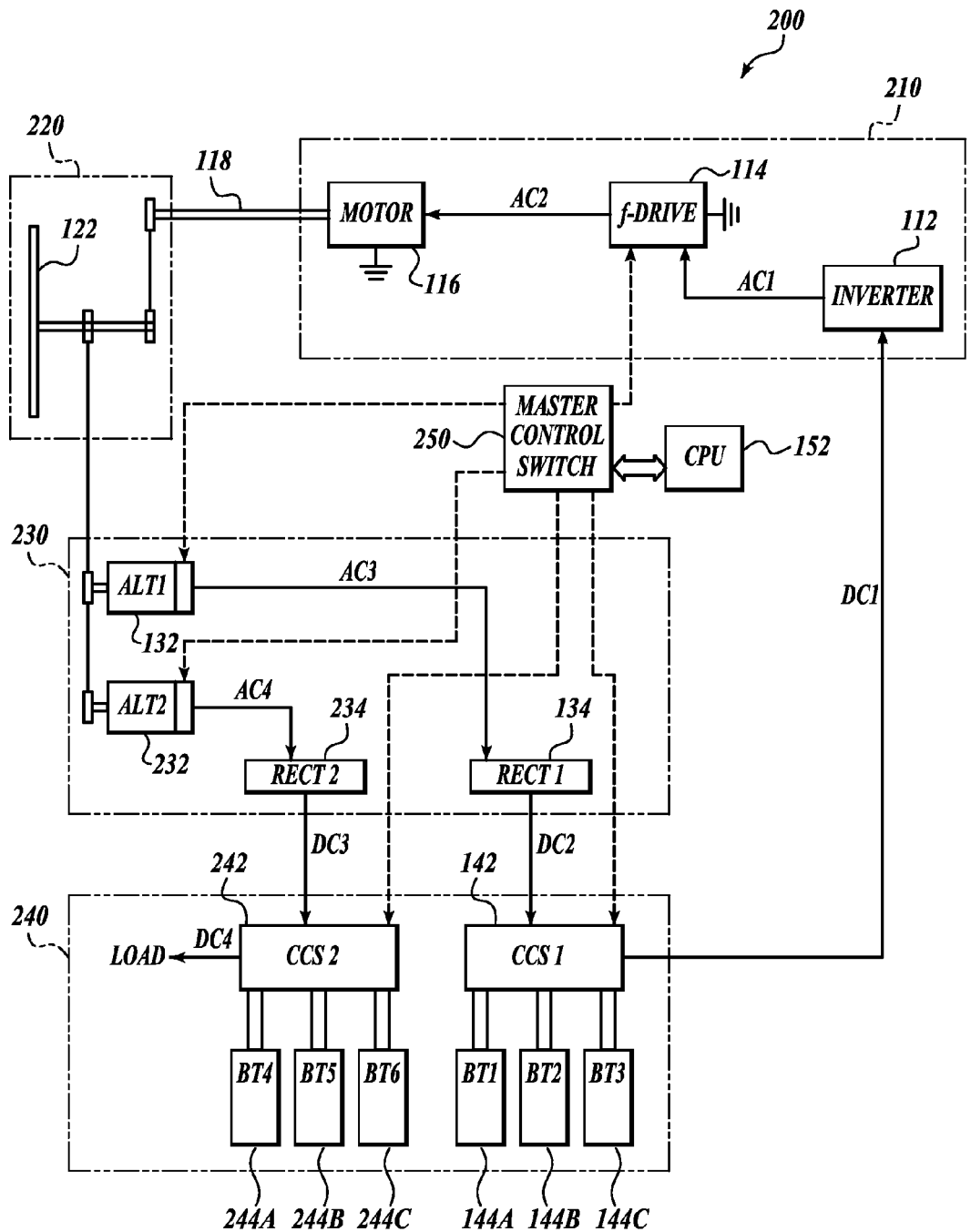
FIG. 2 is a system diagram of a second embodiment of a power distribution system in accordance with the present invention.

Refer now to FIG. 2 showing a second embodiment of a power distribution system 200 in accordance with the present invention. The system 200 is similar to the system 100 shown in FIG. 1, and the description of common aspects will not be repeated, for brevity and clarity. In this embodiment, the first stage 210 and the second stage 220 are similar to the first and second stages 110 and 120, respectively, as described above.

The third stage 230 in this embodiment includes a second alternator 232 that may be the same or similar to the first alternator 132. The second alternator 232 is also driven by the motor 116 through the flywheel 122. The second alternator 232 generates a fourth alternating current $AC_4$. A second rectifier 234 receives the fourth alternating current $AC_4$ to produce a corresponding third direct current $DC_3$. The second rectifier 234 may be the same or similar to the first rectifier 134.

The fourth stage 240 in this embodiment includes a second charge control switch 242 that is configured to receive the third direct current $DC_3$ from the second rectifier 234. A second plurality of batteries 244A, 244B, and 244C are connected to the second charge control switch 242. The second charge control switch 242 is operable to sequentially transition the second plurality of batteries 244A-244C such that one subset (e.g., two) of the second plurality of batteries 244A-244C is charged by the third direct current $DC_3$, and another subset (e.g., one) of the plurality of batteries 244A-244C produces a fourth direct current $DC_4$ for an external load.

Therefore, in the system 200, the fourth stage comprises two power output subsystems, wherein one subsystem is configured to provide the first direct current $DC_1$ to the inverter 112, and the second subsystem provides an output load current $DC_4$. The second charge control switch 242 operates similar to the first charge control switch 142.

The master control switch 250 is configured to control the variable frequency drive 114, the alternators 132, 232, and the charge control switches 142, 242. For example, with regard to the fourth stage 240, the three batteries 244A-244C are transitioned on a fixed period as described above.

It is contemplated that the precise timing of the charge/discharge cycles, the total number of batteries, and the length of overlap to provide parallel load output may be optimized to accommodate the intended application.

Figure 3:
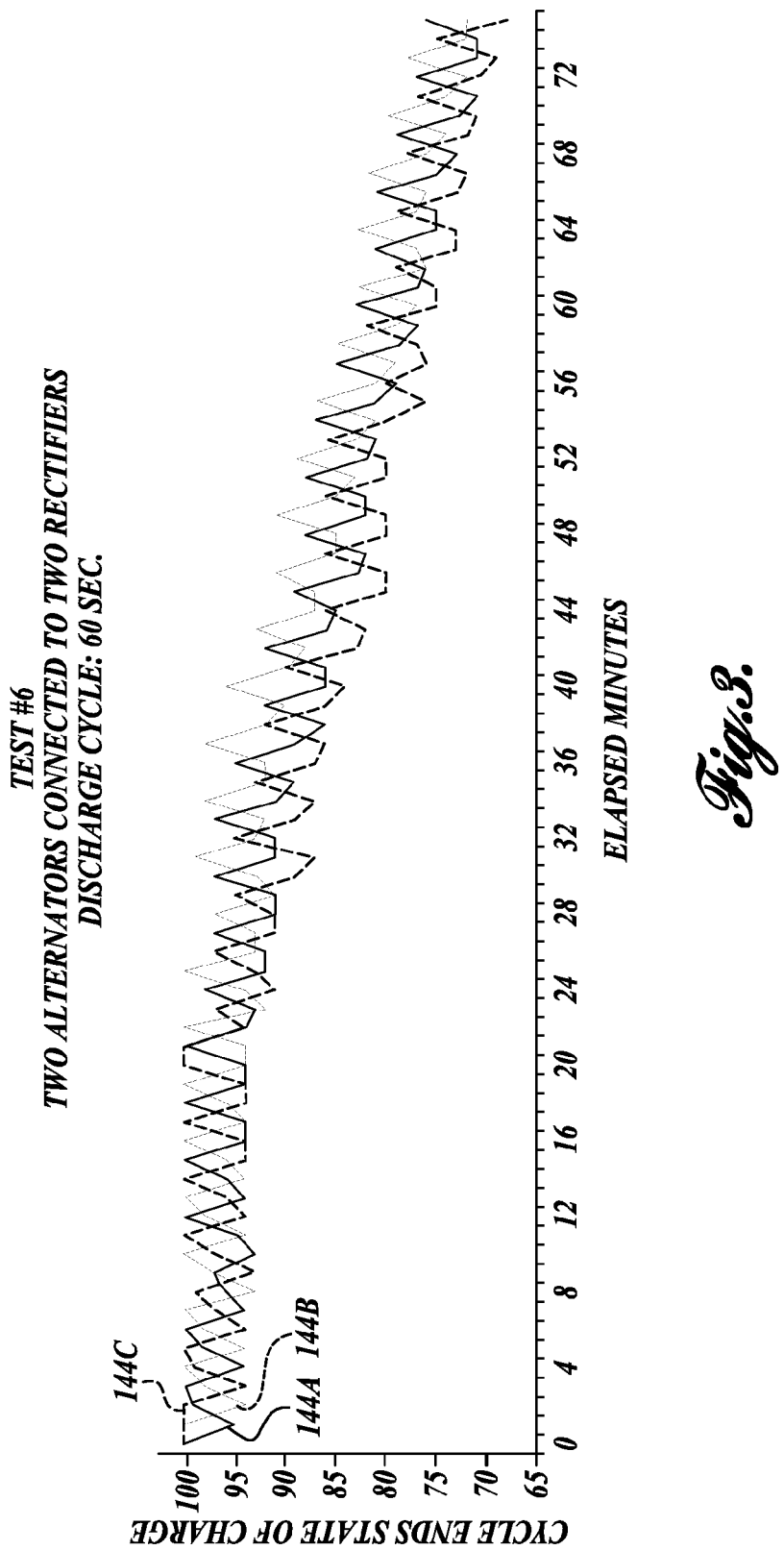
FIG. 3 is a graph showing the charge level of three batteries as a function of time during operation for the system shown in FIG. 2.

FIG. 3 is a plot showing the charge level of the three batteries 144A, 144B, and 144C during operation of the system 200 for about 74 minutes, with a transition interval of 60 seconds. During the first approximately 22 minutes, the batteries 144A, 144B, and 144C remain at a high charge level, which gradually declines thereafter.

Figure 4:
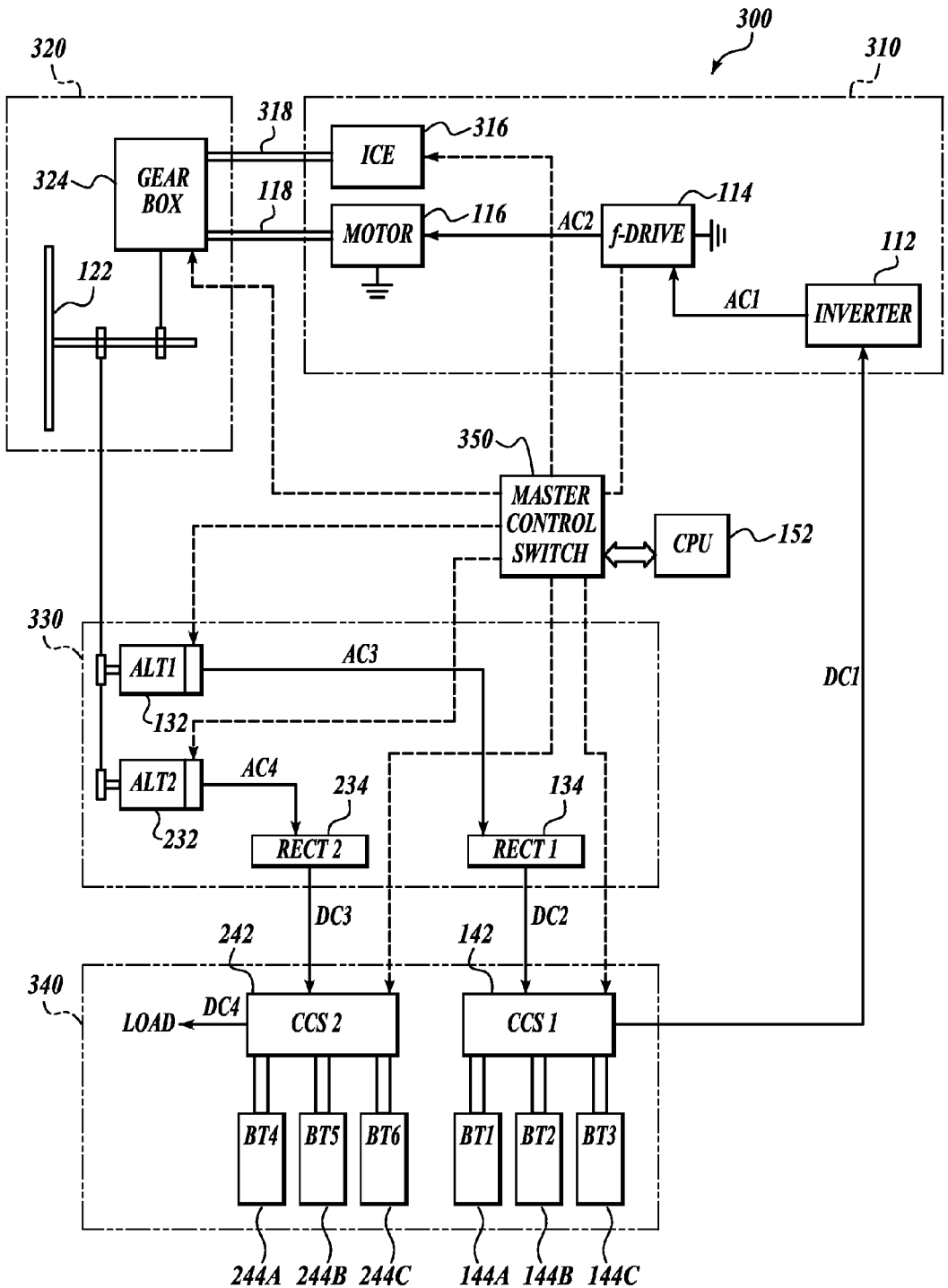
FIG. 4 is a system diagram of a third embodiment of a power distribution system in accordance with the present invention.

Refer now to FIG. 4, which shows a third embodiment of a power distribution system 300 in accordance with the present invention. This third embodiment is similar to the system 200 shown in FIG. 2, and the description of like parts will not be repeated, for brevity and clarity. The first stage 310 includes a power source such as an internal combustion engine 316 that may be engaged to periodically return the batteries 144A-144C and 244A-244C to a fully charged state. The engine 316 is controlled by the master control switch 350 and is configured to operate periodically or intermittently to maintain both sets of batteries 144A, 144B, 144C, and 244A, 244B, 244C in an optimal state of charge.

The motor 116 and the engine 316 engage a switching mechanism in the second stage 320, for example a gearbox 324 or the like, through respective driveshafts 118, 318. The gearbox 324 is preferably controlled by the master control switch 350 to selectively engage the motor 116 or the engine 316 to drive the flywheel 122.

The third stage 330 and fourth stage 340 are substantially similar to the third stage 230 and fourth stage 240 described above.

For example, when the average battery charge level drops below a predetermined charge level, the master control switch 350 signals the engine 316 to start and signals the control switch 142 to interrupt the current to the inverter 112. Any suitable means for determining the battery charge level may be used. For example, the charge level of a lead-acid battery may be determined from the specific gravity of the electrolyte. It is also contemplated that alternative indicators of battery system charge level may be used for measurement against a predetermined charge level, for example, the minimum charge level for any battery, the charge level for a selected battery, the mean battery charge level, etc.

Upon detecting that the battery charge level has reached a predetermined level, the gearbox 324 switches the drive from the motor driveshaft 118 to the engine driveshaft 318 such that the flywheel 122 and alternators 132, 232 are powered by the engine 316, and the master control switch 350 stops power delivery to the inverter 112 such that the motor 116 stops. Therefore, additional energy is available to charge the batteries 144A-144C and 244A-244C. When the batteries 144A-144C and 244A-244C reach a desired level of charge, for example to a fully charged state, the engine 316 is stopped, power to the inverter 112 is restored to restart the motor 116, and the system 300 returns to operation as described above with reference to FIG. 2.

In a particular example, the predetermined charge level is set at a relatively high level, for example, the predetermined charge level may be between 75% and 90%, and preferably about 90%, of the fully charged level. Therefore the batteries 144A-144C and 244A-244C are always at a relatively high charge level. This relatively high charge level prevents or mitigates potential damage from battery cycling, and in particular from deep cycling. It will be appreciated that many batteries, including, for example, conventional automotive starting batteries, can easily be damaged by deep discharge cycles. Repeated deep discharge cycles will result in capacity loss and ultimately in premature failure.

Figure 5A:
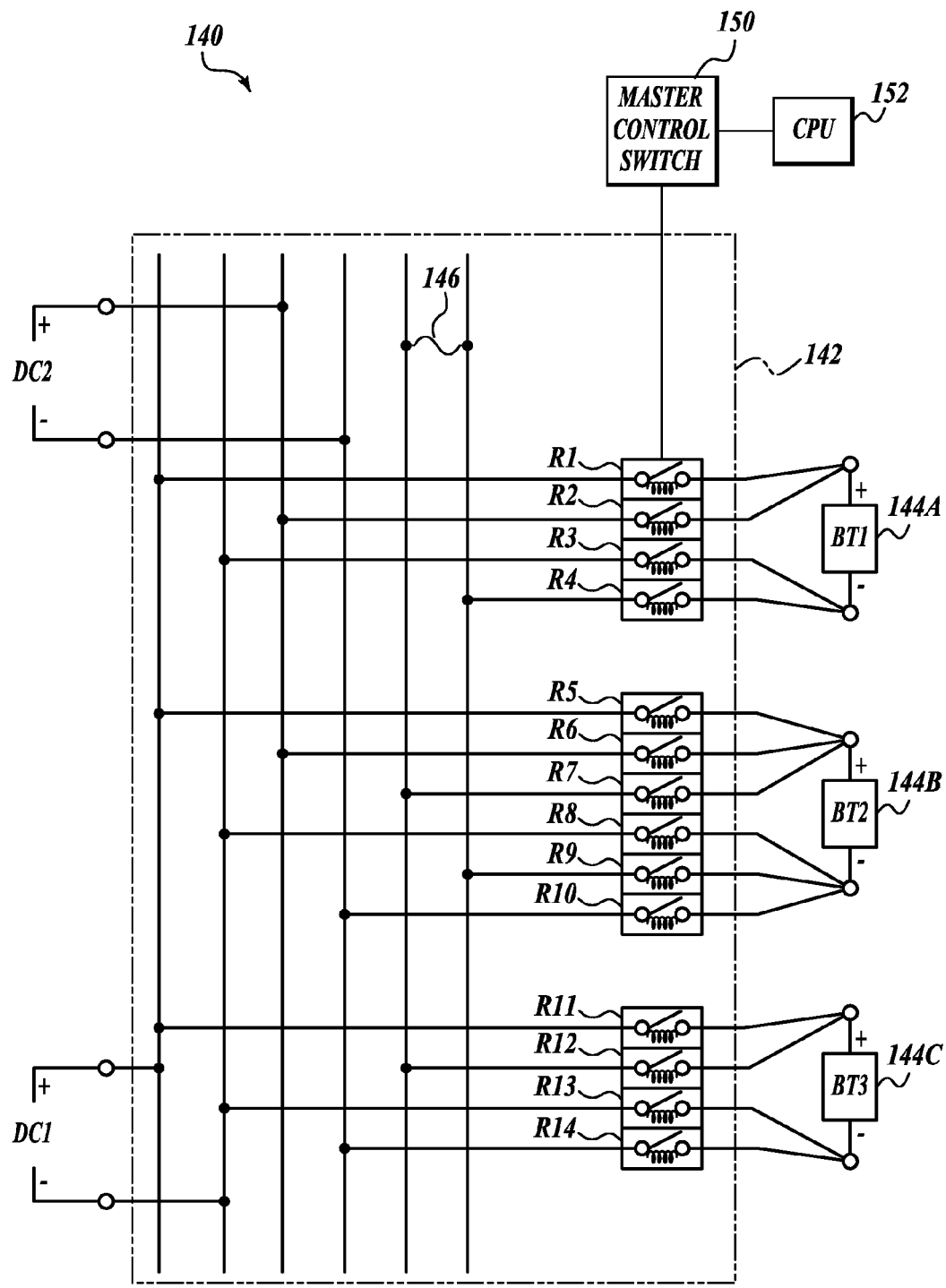
FIG. 5A is a block schematic diagram showing a configuration for the charge control switch to facilitate connecting the charging batteries in series during the charging period.

FIG. 5A is a block diagram showing schematically an embodiment of the fourth stage 140 comprising a plurality of interconnected controllable relays R1-R14 that are configured to facilitate cycling the batteries 144A-144C through the charge and load periods described above, and including a protective fuse 146. Although a current embodiment uses conventional relays to transition the batteries through the charging and load configurations, any conventional switching mechanism may be used as are known in the art, including, for example, micro-switches and the like.

For example, in FIG. 5A when relays R2, R4, R7, R10, R11, and R13 are closed, and the other relays are open, batteries 144A and 144B are connected in series with the charging current $DC_2$, and battery 144C provides the load current $DC_1$. When relays R1, R3, R6, R9, R12, and R14 are closed and the other relays are open, then batteries 144B and 144C are connected in series with the charging current $DC_2$, and battery 144A provides the load current $DC_1$. When relays R2, R4, R5, R8, R12, and R14 are closed and the other relays are open, batteries 144A and 144B are connected in series with the charging current $DC_2$, and battery 144B provides the load current $DC_1$. The second charge control switch 242 may be similarly wired to the second set of batteries 244A-244C.

Figure 5B:
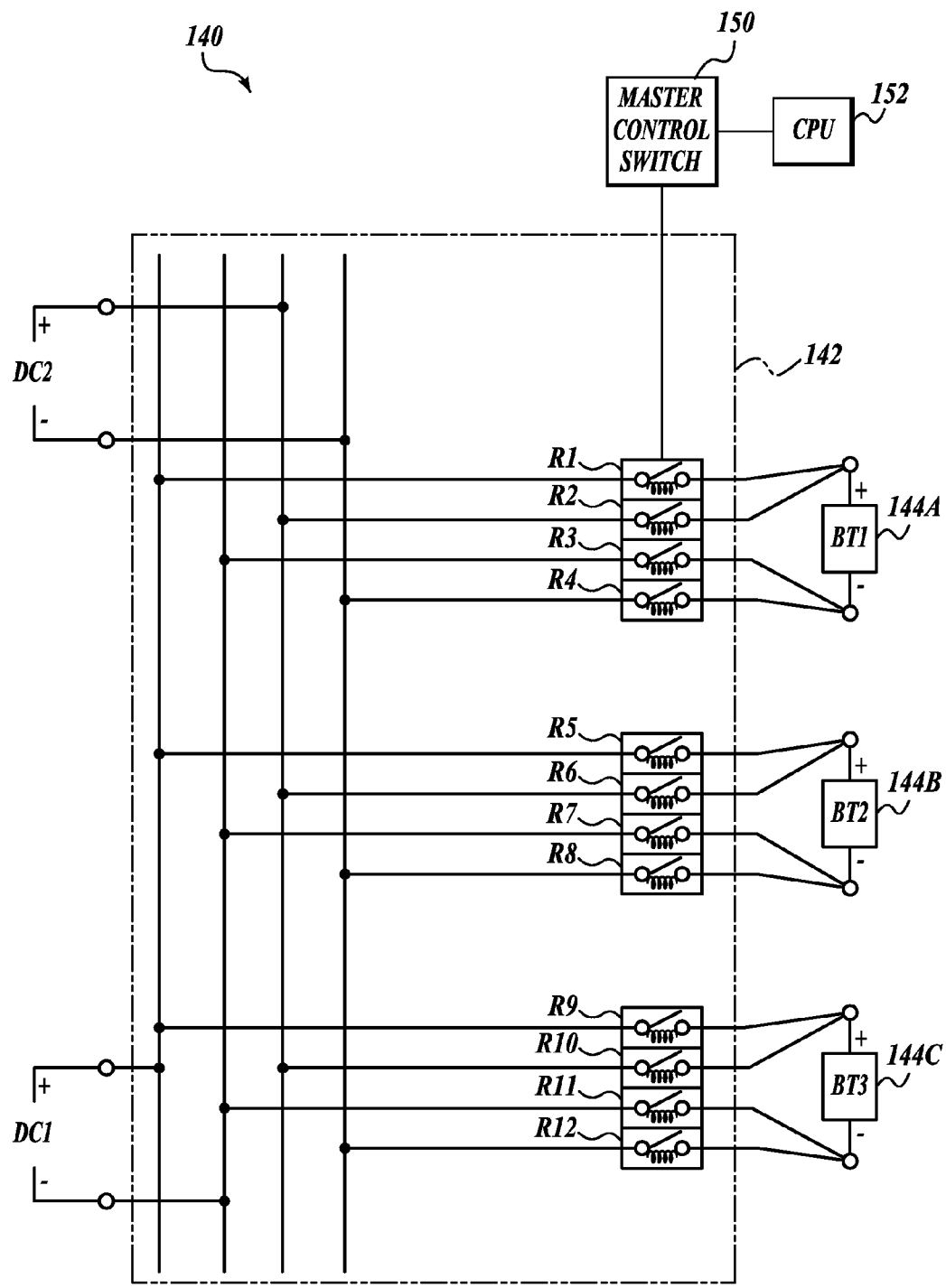
FIG. 5B is a block schematic diagram showing a configuration for the charge control switch to facilitate connecting the charging batteries in parallel during the charging period.

In an alternative embodiment one or both of the charge control switches 142, 242 may be configured such that the charging batteries are connected in parallel during the charging period. FIG. 5B is a block diagram showing the fourth stage 140 schematically and configured to facilitate transitioning the batteries 144A-144C through the charging and load configurations such that during charging, the two charging batteries are connected in parallel. In this example, when relays R2, R4, R6, R8, R9, and R11 are closed and all other relays are open, batteries 144A and 144B are connected in parallel in a charging configuration, and battery 144C provides the load current $DC_1$. The relay configurations to transition the batteries between the charging configuration and the load configuration will be apparent to persons of skill in the art.

It is contemplated that when using multiple charge control switches, one, some, or all of the charge control switches may be configured such that batteries that are charging are in parallel, and one, some, or all of the charge control switches may be configured such that batteries that are charging are in series.

It should be appreciated that the battery in the load configuration in the above examples is independent of the batteries in the charging configuration.

While illustrative embodiments have been illustrated and described, it will be appreciated that various changes can be made therein without departing from the spirit and scope of the invention.

The embodiments of the invention in which an exclusive property or privilege is claimed are defined as follows:
1. A four-stage power distribution system comprising:
a first stage comprising (i) an inverter configured to receive a first direct current and to generate a first alternating current, (ii) a frequency drive configured to receive the first alternating current and to generate a second alternating current; and (iii) an electric motor configured to receive the second alternating current and to rotationally drive a driveshaft;
a second stage comprising (iv) a flywheel drivably attached to the driveshaft;

a third stage comprising (v) a first alternator drivably connected to the driveshaft and configured to generate a third alternating current, and (vi) a first rectifier configured to receive the third alternating current and to generate a second direct current;

a fourth stage comprising (vii) a first charge control switch configured to receive the second direct current, and (viii) a first plurality of batteries;

wherein the first charge control switch sequentially transitions the plurality of batteries between a charging configuration wherein at least one of the plurality of batteries is charged by the second direct current and a load configuration wherein at least one of the plurality of batteries provides the first direct current to the inverter; and (ix) a master control switch operably connected to control the first charge control switch.

2. The four-stage power distribution system of claim 1, wherein the second alternating current generated by the frequency drive is a three-phase alternating current.

3. The four-stage power distribution system of claim 1, wherein the first charge control switch transitions the plurality of batteries between the charging configuration and the load configuration at fixed intervals.

4. The four-stage power distribution system of claim 3, wherein the fixed intervals are between 45 seconds and 90 seconds.

5. The four-stage power distribution system of claim 1, wherein the electric motor is a gear motor and the first alternator is a permanent magnet alternator.

6. The four-stage power distribution system of claim 1, wherein the flywheel is a low-speed flywheel that rotates at a rate of less than 300 rotations per minute.

7. The four-stage power distribution system of claim 1, wherein the third alternating current generated by the first alternator is a three-phase alternating current.

8. The four-stage power distribution system of claim 1, wherein the plurality of batteries comprise a first battery, a second battery, and a third battery.

9. The four-stage power distribution system of claim 8, wherein the first charge control switch repeatedly cycles through the plurality of batteries such that at a given time, two of the first, second, and third batteries are connected in series in the charging configuration, and the other of the first, second, and third batteries provides the first direct current.

10. The four-stage power distribution system of claim 8, wherein the first charge control switch repeatedly cycles through the plurality of batteries such that at a given time, two of the first, second, and third batteries are connected in parallel in the charging configuration, and the other of the first, second, and third batteries provides the first direct current.

11. The four-stage power distribution system of claim 8, wherein at fixed intervals one of the first, second, and third batteries is transitioned from the charging configuration to the load configuration, and another one of the first, second, and third batteries is transitioned from the load configuration to the charging configuration.

12. The four-stage power distribution system of claim 11, wherein the one of the first, second, and third batteries is transitioned from the charging configuration to the load configuration before the other one of the first, second, and third batteries is transitioned from the load configuration to the charging configuration, such that for a brief overlap period, both of the transitioning batteries are connected in parallel to provide the first direct current.

13. The four-stage power distribution system of claim 12, wherein the overlap period is less than 0.3 seconds.

14. The four-stage power distribution system of claim 1, wherein the charge control switch comprises a plurality of relays that are operably connected to the plurality of batteries, and wherein the plurality of relays are controlled by the master control switch.

15. The four-stage power distribution system of claim 1, wherein the first alternator further comprises a fan, and further wherein the master control switch is operably connected to control the fan.

16. The four-stage power distribution system of claim 1, wherein:
the third stage further comprises (x) a second alternator drivably connected to the driveshaft and configured to generate a fourth alternating current, and (xi) a second rectifier configured to receive the fourth alternating current and to produce a third direct current; and
the fourth stage further comprises (xii) a second charge control switch configured to receive the third direct current, and (xiii) a second plurality of batteries that are operably connected to second charge control switch;
wherein the second charge control switch sequentially transitions the second plurality of batteries between a charging configuration wherein at least one of the second plurality of batteries is charged by the third direct current and a load configuration wherein at least one of the second plurality of batteries provides a fourth direct current.

17. The four-stage power distribution system of claim 1, wherein the second stage further comprises a mechanical switching mechanism that drivably connects the electric motor to the flywheel, and the second stage further comprises an engine that is drivably connected to the mechanical switching mechanism, wherein the master control switch selectively switches between a primary mode wherein the electric motor drives the flywheel and the engine is not operating, and a charging mode wherein the engine drives the flywheel and the electric motor is not operating.

18. The four-stage power distribution system of claim 1, wherein the mechanical switching mechanism comprises a gearbox.

19. A four-stage power distribution system comprising:
a first stage comprising an inverter, a variable frequency drive, and an electric motor, wherein the inverter provides alternating current to the variable frequency drive, and the variable frequency drive provides power to the electric motor;
a second stage comprising a flywheel that is drivably connected to the electric motor;
a third stage comprising an alternator and a rectifier, wherein the alternator is drivably connected to the electric motor and provides alternating current to the rectifier;
a fourth stage comprising a first charge control switch and a plurality of batteries, wherein the charge control switch distributes electric power from the rectifier to the plurality of batteries;
wherein the charge control switch sequentially and individually transitions the plurality of batteries between a charging configuration and a load configuration such that at any time, at least one of the plurality of batteries is in the charging configuration and at least one of the plurality of batteries is in the load configuration.

20. The four-stage power distribution system of claim 19, wherein the at least one of the plurality of batteries in the load configuration provides direct current to the inverter.

* * * * *